Patented Apr. 27, 1954

2,676,934

UNITED STATES PATENT OFFICE 2,676,934

WAX COMPOSITION CONTAINING A COMPLETELY ESTERIFIED STYRENE-MALEIC ANHYDRIDE HETEROPOLYMER

John Mann Butler, Dayton, Ohio, assignor to Monsanto Chemical Company, St. Louis, Mo., a corporation of Delaware No Drawing. Application November 23, 1951, Serial No. 257,952

1 Claim. (Cl. 260—28.5)

This invention relates to wax or wax-containing compositions having improved toughness and relates particularly to compositions which are adapted to be used in connection with the impregnation and coating of fibrous products, such as paper, textiles, leather and wood.

An object of this invention is to improve the physical properties of hydrocarbon wax compositions containing said waxes of various types and proportions. Another object is to provide compositions which are adapted to impregnating paper or paper products, particularly for impregnating paper which is to be used for wrapping or for the forming of objects of paper where some degree of adhesiveness is required.

It has now been discovered that certain esterified styrene-maleic anhydride resins are, in certain proportions, completely compatible with hydrocarbon waxes, particularly paraffinic waxes, and that the homogeneous blends thereof have unusual and very desirable physical properties, such as improved tensile strength, deflection, clarity and gloss, and adhesion to paper, metal, wood and synthetic resins. Suitable waxes are the paraffin waxes, including both the microcrystalline waxes and the lower melting paraffin waxes and the earth waxes such as ceresin or ozokerite. The new compositions may be made by mixing from 0.10 to 30.0 per cent by weight of the esterified styrene-maleic anhydride resin with from 99.90% to 70.0% of the wax, but preferred compositions will have 80 or more per cent of the wax, the percentages being based on the total wax and esterified styrene-maleic anhydride resin in the composition. Various other modifying agents such as fillers, plasticizers, pigments and adhesives may be added as desired in the manner conventional in the art of coating compositions.

The esterified styrene-maleic anhydride resins used in the practice of this invention are those in which a heteropolymer of styrene and maleic anhydride has been esterified with a saturated, unsubstituted aliphatic alcohol of from 8 to 16 carbon atoms. Styrene-maleic anhydride heteropolymers are well known in the art. They are obtainable by subjecting to polymerizing conditions a mixture of styrene and maleic anhydride, substantially as described in the Fikentscher U. S. Patent No. 1,976,679 and the Voss U. S. Patent No. 2,047,398. For the present purposes, the heteropolymer of one mole of styrene with one mole of maleic anhydride is preferred. Such a heteropolymer is composed of a number of polymerized groups having the probable formula

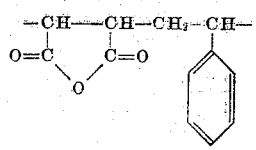

Esterification of the maleic anhydride-styrene copolymer with aliphatic, unsubstituted, saturated alcohols of from 8 to 16 carbon atoms yields products which contain a plurality of units containing the probable formula

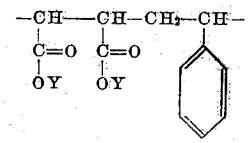

in which Y is an alkyl radical of from 8 to 16 carbon atoms.

Alcohols which may be employed for the esterification include the straight chain, normal fatty alcohols such as decyl, hendecyl, dodecyl, tridecyl, tetradecyl or hexadecyl alcohol or branched chain alcohols such as 2-butyloctanol-1,2,6,8-trimethylnonanol-4, or tert-dodecyl alcohol. Mixtures of the alcohols may be used. Reaction of the alcohol with the styrene-maleic anhydride heteropolymer to yield the useful esterified heteropolymers is effected by heating a mixture of the two in the presence of an esterifying catalyst, e. g., phosphoric acid, sulfuric acid or 4-toluenesulfonic acid and, advantageously, in the presence of a small amount, e. g., up to 5 per cent, of a material such as xylene or toluene to aid in removing reaction water. In order to completely esterify the styrene-maleic anhydride heteropolymer, it is generally necessary to employ in the reaction mixture at least a slight excess of the theoretically required amount of alcohol, i. e., two moles of alcohol for each of the maleic anhydride groups of the heteropolymer.

The present compositions may be applied to paper, textiles, or generally any fibrous material by impregnation or coating such as by dipping the material into the molten composition, or in solutions of the composition in suitable solvents. Such application may be made by hand by merely dipping the material to be impregnated or coated into the molten composition or into a solution of the same in a suitable solvent. If desired, application may be made by machine in which continuous webs or sheets of the material to be treated are drawn through the baths of the compounds herein disclosed, or by callender rolls, heated if desired, which force the solid composition into the interstices of the fibrous composition being impregnated. Application to the surface of papers, felt, cloth, or other fabrics may be accomplished by use of a spreading technique, whereby the thickness of the application is regulated by means of adjustable spreader bars or doctor blades in the manner well known to the art.

Suitable hydrocarbon waxes for blending in accordance with this invention are the waxes having melting or softening points over 100° F.

and preferably those which remain relatively hard and rigid at temperatures up to 120° F. Of particular importance are the microcrystalline paraffin waxes having melting points between 140° F. and 200° F., the low melting paraffins, and the hydrocarbon earth waxes, for example, refined ceresin.

Further details of the practice of this invention are set forth with respect to the following specific examples.

Example 1

Styrene-maleic anhydride resin prepared from substantially equimolar proportions of styrene and maleic anhydride and having a solution viscosity of 80 cps. was esterified with Lorol, a mixture of $C_8$ to $C_{16}$ alcohols prepared by hydrogenation of coconut oil, employing the following procedure:

Into a 300 ml. flask equipped with agitator, thermometer, Dean-Stark water trap and condenser were placed 20.2 g. (0.1 mole) of the styrene-maleic anhydride resin, 41 g. (0.22 mole) of the Lorol, 60 g. of xylene and 0.16 g. (0.33 ml.) of sulfuric acid and the resulting mixture was heated at a temperature of 146° C. for about 15 hours. The product was then mixed with isobutyl alcohol and the resulting precipitated product dried in a vacuum oven. The dried material was the substantially pure Lorol ester of styrene-maleic anhydride heteropolymer. It will hereinafter be designated as LSMA.

Incorporation of this ester into paraffin wax was effected by heating 2 g. of the ester with 40 g. of paraffin wax to about 130° C. The esterified heteropolymer dissolved in the wax and remained dissolved when the wax mixture was cooled to the crystallization point of the wax. This wax blend had an LSMA content of 5%. In the same manner wax blends having an LSMA content of 2.5%, 1.0% and 0.5%, respectively, were prepared. For purposes of comparison, wax blends containing like concentrations of polyethylene, a commercially employed wax modifier, instead of LSMA, were prepared. Evaluation of the resulting modified waxes employing conventional test methods and test equipment gave the following results:

|  |  | Percent Modifier in Wax | | | |
|---|---|---|---|---|---|
|  |  | 0.5 | 1.0 | 2.5 | 5.0 |
| Cloud Point, °C | PE* | 55 | 65 | 76.5 | 76.5 |
|  | LSMA | 53.8 | 53.8 | 53.8 | 54 |
| Tensile Strength, p. s. i., 23° C | PE* | 188 | 222 | 278 | 298 |
|  | LSMA | 260 | 298 | 305 | 298 |
| Deflection in in. per inch at time of breaking; 0.5" dimension in horizontal position when tested, at 23° C. | PE* | .0136 | .0175 | .0185 | .0229 |
|  | LSMA | .0158 | .0182 | .0307 | .0589 |

*Polyethylene

The above data show that the LSMA modified wax, particularly at the 5% concentration, was characterized by superior softening point and cloud point property. In small concentrations the LSMA has a pronounced effect on increasing the tensile strength of the wax. The LSMA modified wax shows up very well on the slow deflection bend test.

Example 2

Fifty parts by weight of a microcrystalline paraffin wax having a melting point of 172° F. was melted with 30 parts by weight of the LSMA of Example 1. Thereafter 15 parts by weight of hydrogenated glyceryl abietate and 5 parts of butyl phthalyl butyl glycolate were added and thoroughly blended. This product was used to impregnate paper which was valuable in wrapping cheese because of its ability to resist cracking and crushing, and to withstand the rough handling encountered in shipping operations.

Example 3

A coated paper useful in wrapping bread and other food stuffs by reason of its more adhesive nature was prepared by blending the following materials.

| | Parts by weight |
|---|---|
| Microcrystalline wax, M. P. 172° F | 20 |
| LSMA (Example 1) | 8 |
| Paraffin wax, M. P. 146–148° F | 72 |

While the present invention has been disclosed with particular reference to the incorporation of the Lorol ester of styrene and maleic anhydride into hydrocarbon waxes, the alcohol employed for the preparation of this ester being particularly readily available, equally good results are obtained by incorporation with the hydrocarbon waxes of from 0.10 per cent to 30 per cent of other esters of styrene-maleic anhydride heteropolymers and alcohols of from 8 to 16 carbon atoms. Thus instead of the Lorol ester of Example 1, there may be prepared in like manner $C_{12}$ fatty alcohol esters of styrene-maleic anhydride heteropolymer such as the n-dodecyl ester or the tetradecyl ester, or esters of styrene-maleic anhydride heteropolymers with alcohols of higher or lower carbon content such as decyl alcohol, hexadecyl alcohol, etc.

Although the invention has been described with respect to the specific embodiments, it is not intended that the details thereof shall be construed as limitations upon the scope of the invention except to the extent incorporated in the following claim.

What I claim is:

A coating composition comprising a paraffin wax and a completely esterified styrene-maleic anhydride heteropolymer made by reacting the heteropolymer with a mixture of alcohols obtained by hydrogenation of coconut oil, said wax being present to the extent of from 70 to 99.90 per cent by weight of the total weight of the wax and the esterified styrene-maleic anhydride heteropolymer.

References Cited in the file of this patent

UNITED STATES PATENTS

| Number | Name | Date |
|---|---|---|
| 2,454,284 | Kirk | Nov. 23, 1948 |
| 2,599,339 | Lippincott et al. | June 3, 1952 |